United States Patent
Oshida

(10) Patent No.: US 11,377,080 B2
(45) Date of Patent: Jul. 5, 2022

(54) CONTROLLER, CONTROL METHOD, AND BRAKE SYSTEM

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

(*) Notice: Subject to any disclaimer, the term of this patent is extended or adjusted under 35 U.S.C. 154(b) by 364 days.

(21) Appl. No.: 16/605,572

(22) PCT Filed: Mar. 13, 2018

(86) PCT No.: PCT/IB2018/051653
§ 371 (c)(1),
(2) Date: Oct. 16, 2019

(87) PCT Pub. No.: WO2018/197965
PCT Pub. Date: Nov. 1, 2018

(65) Prior Publication Data
US 2020/0070789 A1    Mar. 5, 2020

(30) Foreign Application Priority Data
Apr. 17, 2017 (JP) .............................. JP2017-081002

(51) Int. Cl.
*B60T 8/00* (2006.01)
*B60T 8/17* (2006.01)
(Continued)

(52) U.S. Cl.
CPC .............. *B60T 8/1706* (2013.01); *B60T 7/22* (2013.01); *B60T 8/328* (2013.01); *B60T 8/3225* (2013.01);
(Continued)

(58) Field of Classification Search
CPC ............. B60T 8/1706; B62L 3/08; B62L 3/00
See application file for complete search history.

(56) References Cited

U.S. PATENT DOCUMENTS 8,783,695 B2 * 7/2014 Murakami .......... B60W 10/184
280/5.514
2008/0046159 A1   2/2008 Baijens et al.
(Continued)

FOREIGN PATENT DOCUMENTS

DE    102013200044    7/2014
EP       1769990       4/2007
(Continued)

OTHER PUBLICATIONS

International Search Report for Application No. PCT/IB2018/051653 dated Jul. 13, 2018 (English Translation, 3 pages).

*Primary Examiner* — Truc M Do
(74) *Attorney, Agent, or Firm* — Michael Best & Friedrich LLP

(57) ABSTRACT

The invention obtains a controller and a control method capable of improving safety by an automatic deceleration operation while preventing a motorcycle from falling over. The invention also obtains a brake system that includes such a controller.

In the controller, the control method, and the brake system according to the invention, a control mode is initiated in response to trigger information that is generated in accordance with peripheral environment of the motorcycle, and the control mode makes the motorcycle, which includes a damping device damping kinetic energy, execute the automatic deceleration operation. In the control mode, the automatic deceleration operation is executed in a state where a damping rate of the damping device is increased to be higher than that immediately before initiation of the control mode.

10 Claims, 7 Drawing Sheets

(51) Int. Cl.
  *B60T 7/22*   (2006.01)
  *B60T 8/32*   (2006.01)
  *B60W 10/18*  (2012.01)
  *B60W 10/20*  (2006.01)
  *B60W 30/09*  (2012.01)

(52) U.S. Cl.
  CPC ............ *B60W 10/18* (2013.01); *B60W 10/20* (2013.01); *B60W 30/09* (2013.01); *B60T 2201/022* (2013.01); *B60T 2260/02* (2013.01); *B60W 2300/36* (2013.01); *B60W 2510/18* (2013.01)

(56) References Cited

U.S. PATENT DOCUMENTS

| | | | |
|---|---|---|---|
| 2011/0163516 A1 | 7/2011 | Whinnery | |
| 2014/0284899 A1* | 9/2014 | Takenaka | B62K 21/00 280/279 |
| 2016/0311444 A1* | 10/2016 | Oshima | B60W 10/11 |
| 2017/0028971 A1* | 2/2017 | Kajiyama | B60W 30/08 |
| 2017/0327109 A1* | 11/2017 | Watanabe | B60W 30/04 |

FOREIGN PATENT DOCUMENTS

| | | |
|---|---|---|
| EP | 2834133 | 6/2016 |
| EP | 3093197 | 11/2016 |
| GB | 2494496 | 3/2013 |
| JP | H0966822 A | 3/1997 |
| JP | 2008018832 A | 1/2008 |
| JP | 2009116882 | 5/2009 |
| WO | 2017071882 | 5/2017 |

\* cited by examiner

CONTROLLER, CONTROL METHOD, AND BRAKE SYSTEM

BACKGROUND OF THE INVENTION

The present disclosure relates to a controller and a control method capable of improving safety by an automatic deceleration operation while preventing a motorcycle from falling over, and to a brake system that includes such a controller.

As a conventional technique related to a motorcycle, a technique of improving driver safety has been available.

For example, a driver assistance system is disclosed in JP-A-2009-116882. Based on information detected by a sensor that detects presence of an obstacle in a travel direction or substantially in the travel direction, the driver assistance system warns a driver of the motorcycle that the motorcycle inappropriately approaches the obstacle.

SUMMARY OF THE INVENTION

By the way, in order to further improve the driver safety, it is considered to use a technique of avoiding a collision with the forward obstacle by making the motorcycle execute an automatic deceleration operation that is an operation to decelerate the motorcycle without relying on the driver's operation. Here, the motorcycle tends to have unstable posture when compared to a four-wheeled vehicle, for example. This leads to such a problem that the motorcycle possibly falls over due to deceleration of the motorcycle generated by the automatic deceleration operation.

The invention has been made with the above-described problem as the background and therefore obtains a controller and a control method capable of improving safety by an automatic deceleration operation while preventing a motorcycle from falling over. The invention also obtains a brake system that includes such a controller.

A controller according the invention is a controller that controls behavior of a motorcycle, the motorcycle including a damping device that damps kinetic energy. The controller includes: an acquisition section that acquires trigger information generated in accordance with peripheral environment of the motorcycle; and an execution section that initiates a control mode in response to the trigger information, the control mode making the motorcycle execute an automatic deceleration operation. In the control mode, the automatic deceleration operation is executed in a state where a damping rate of the damping device is increased to be higher than that immediately before initiation of the control mode.

A control method according to the invention is a control method of controlling behavior of a motorcycle, the motorcycle including a damping device that damps kinetic energy. The control method includes: an acquisition step of acquiring trigger information that is generated in accordance with peripheral environment of the motorcycle; and an execution step of initiating a control mode in response to the trigger information, the control mode making the motorcycle execute an automatic deceleration operation. In the control mode, the automatic deceleration operation is executed in a state where a damping rate of the damping device is increased to be higher than that immediately before initiation of the control mode.

A brake system according to the invention is a brake system that includes: a peripheral environment sensor that detects peripheral environment of a motorcycle, the motorcycle including a damping device that damps kinetic energy; and a controller that controls behavior of the motorcycle on the basis of the peripheral environment. The controller includes: an acquisition section that acquires trigger information generated in accordance with the peripheral environment; and an execution section that initiates a control mode in response to the trigger information, the control mode making the motorcycle execute an automatic deceleration operation. In the control mode, the automatic deceleration operation is executed in a state where a damping rate of the damping device is increased to be higher than that immediately before initiation of the control mode.

In the controller, the control method, and the brake system according to the invention, the control mode is initiated in response to the trigger information that is generated in accordance with the peripheral environment of the motorcycle, and the control mode makes the motorcycle, which includes the damping device damping the kinetic energy, execute the automatic deceleration operation. In the control mode, the automatic deceleration operation is executed in the state where the damping rate of the damping device is increased to be higher than that immediately before the initiation of the control mode. In this way, it is possible to prevent movement against a driver's intention from being generated to the motorcycle by the automatic deceleration operation. Therefore, safety can be improved by the automatic deceleration operation while falling of the motorcycle is prevented.

DETAILED DESCRIPTION

Figure 1:
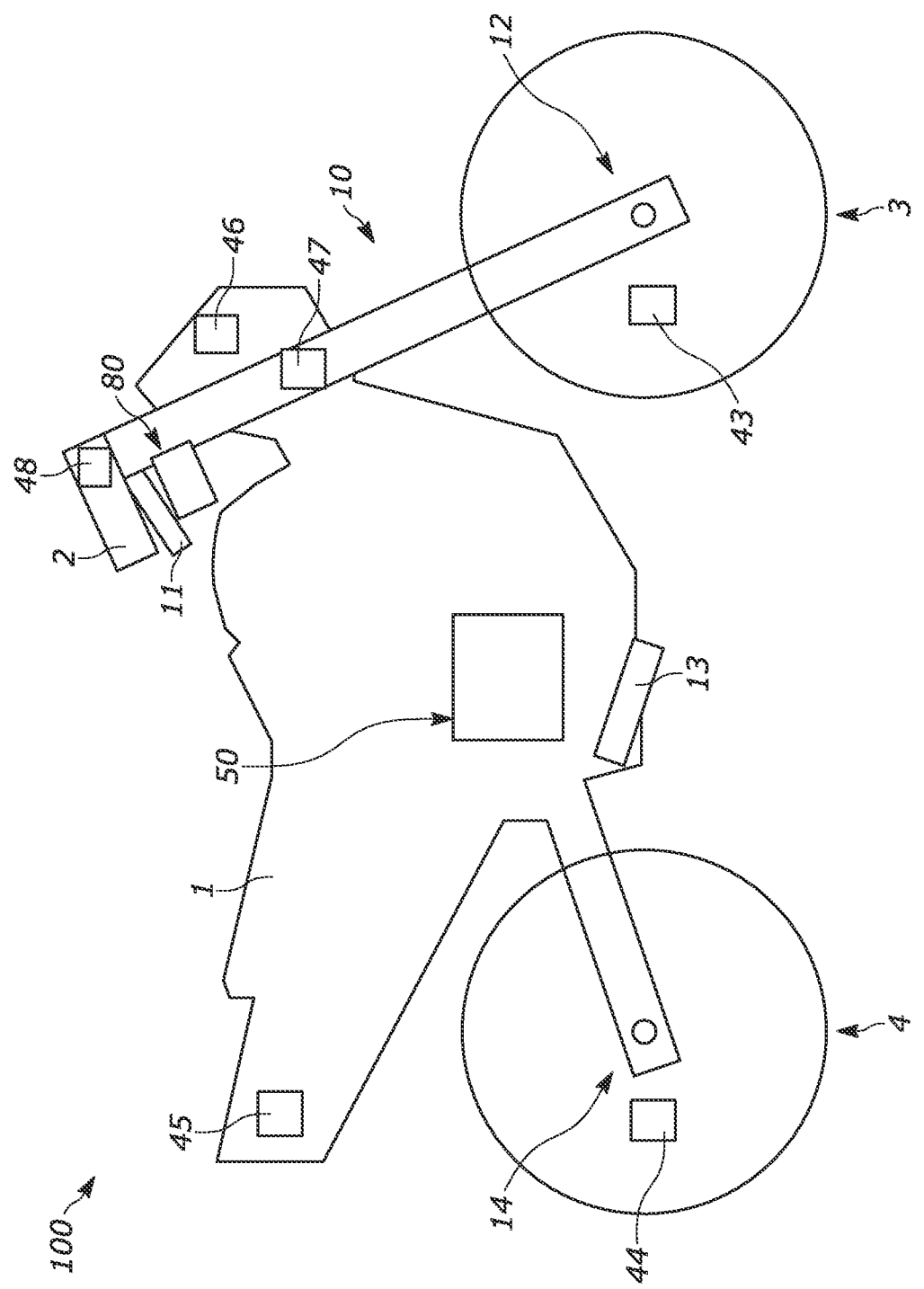
FIG. 1 is a schematic view of an exemplary configuration of a motorcycle on which a brake system according to an embodiment of the invention is mounted.

A description will hereinafter be made on a controller, a control method, and a brake system according to the invention by using the drawings. Note that a description will hereinafter be made on a case where a motorcycle is a two-wheeled motor vehicle; however, the motorcycle may be another motorcycle such as a three-wheeled motor vehicle. In addition, a description will be made on a case where a damping device is a steering damper; however, the damping device may be another damping device (for example, a suspension or the like) that damps kinetic energy of the motorcycle. Furthermore, a description will be made on a case where each of a front-wheel brake mechanism and a rear-wheel brake mechanism is provided in one unit;

however, at least one of the front-wheel brake mechanism and the rear-wheel brake mechanism may be provided in multiple units.

A configuration, an operation, and the like, which will be described below, constitute merely one example, and the controller, the control method, and the brake system according to the invention are not limited to a case with such a configuration, such an operation, and the like.

The same or similar description will appropriately be simplified or will not be made below. In the drawings, the same or similar members or portions will not be denoted by a reference sign or will be denoted by the same reference sign. In addition, a detailed structure will appropriately be depicted in a simplified manner or will not be depicted.

<Configuration of Brake System>

Figure 2:
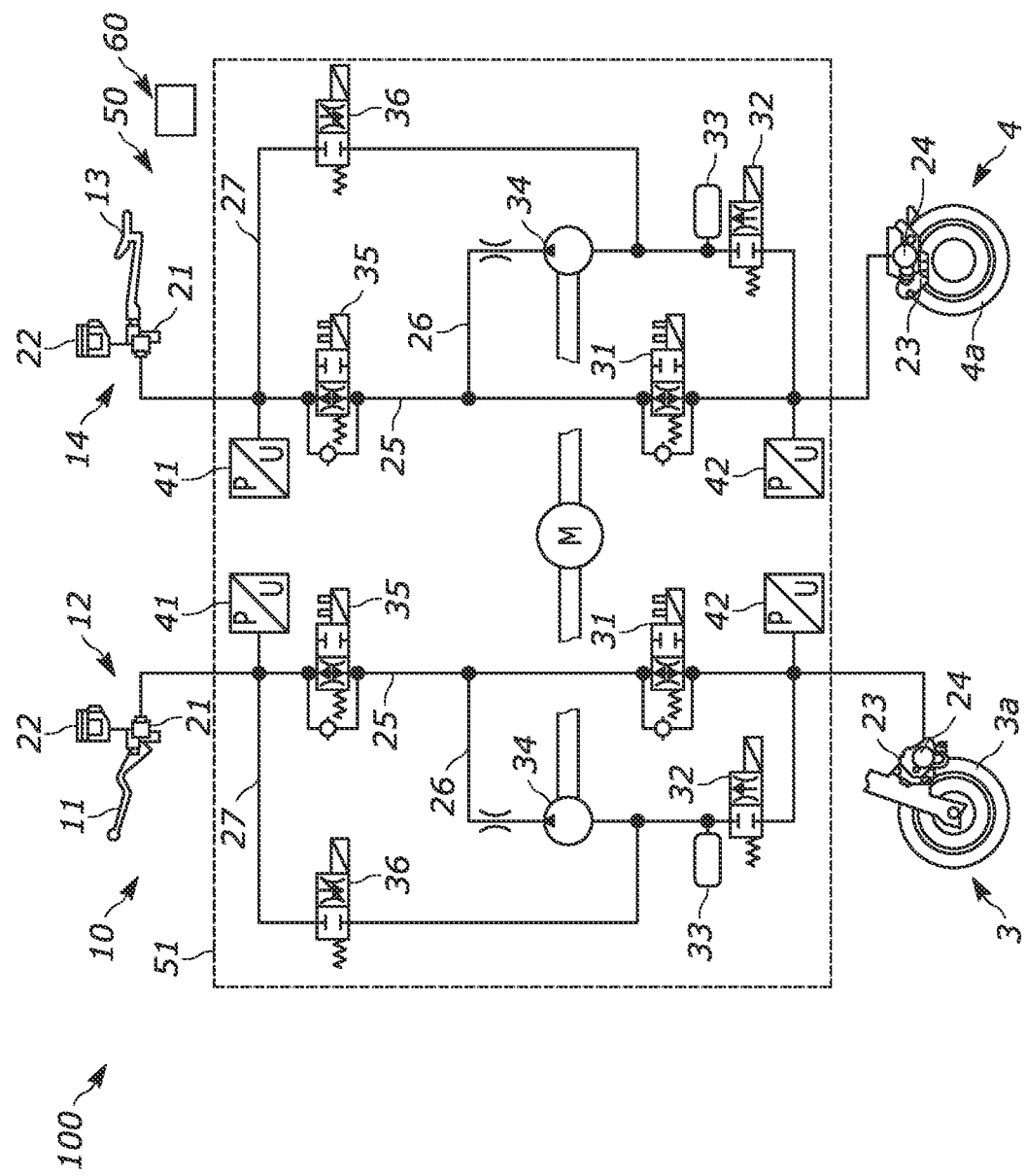
FIG. 2 is a schematic view of an exemplary configuration of the brake system according to the embodiment of the invention.
Figure 3:
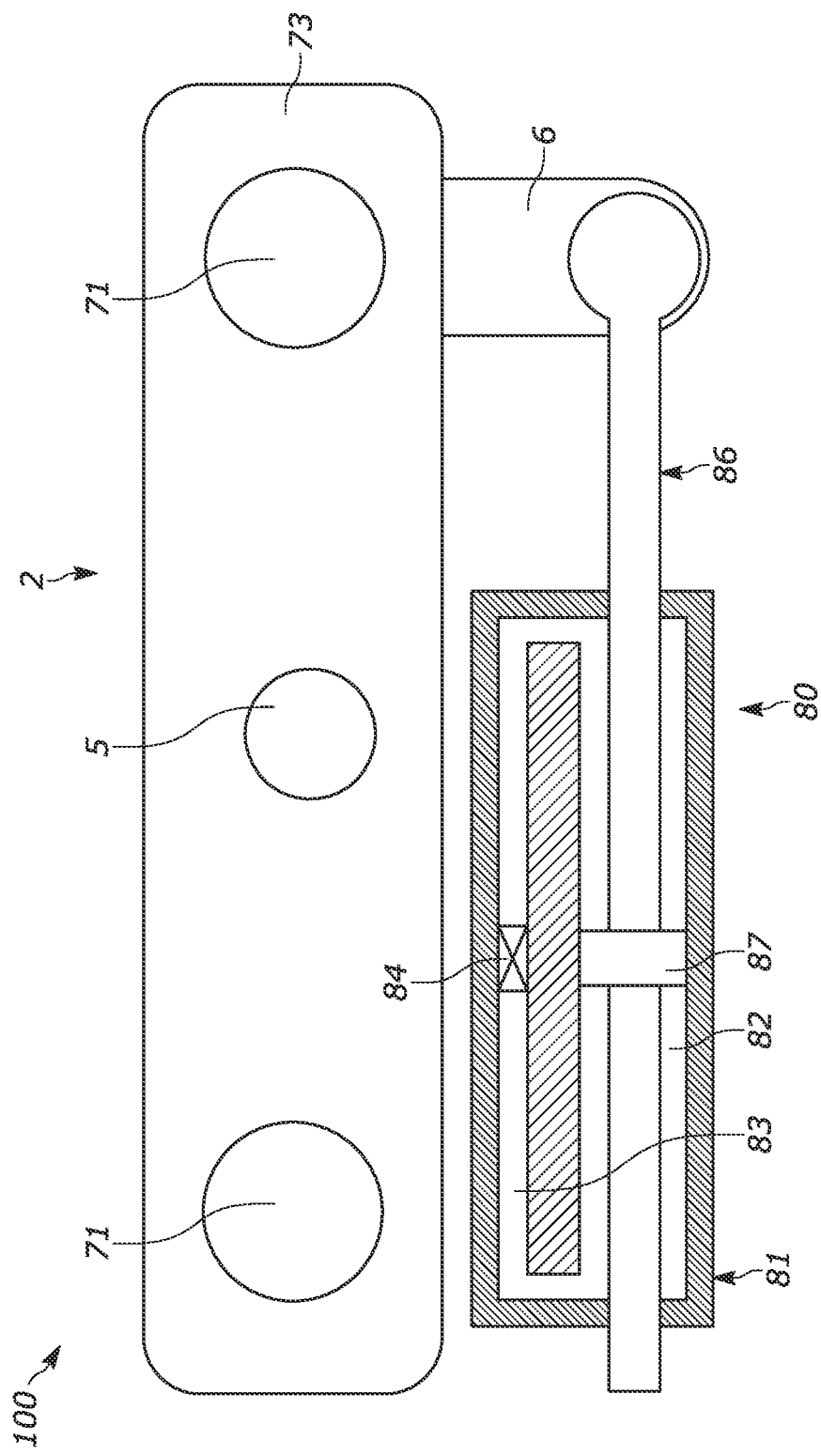
FIG. 3 is a schematic view of an exemplary configuration of a damping device according to the embodiment of the invention.
Figure 4:
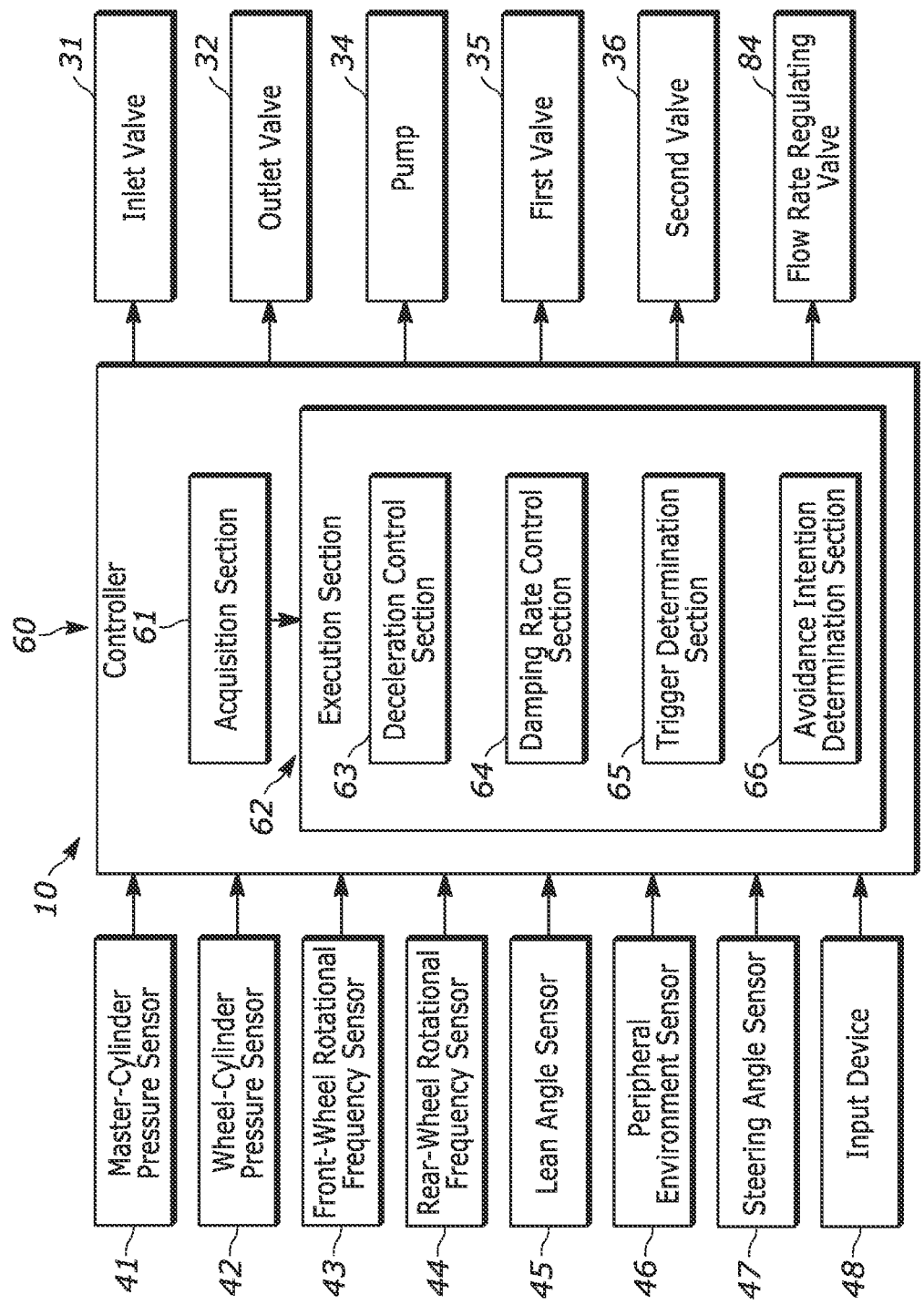
FIG. 4 is a block diagram of an exemplary functional configuration of a controller according to the embodiment of the invention.
Figure 5:
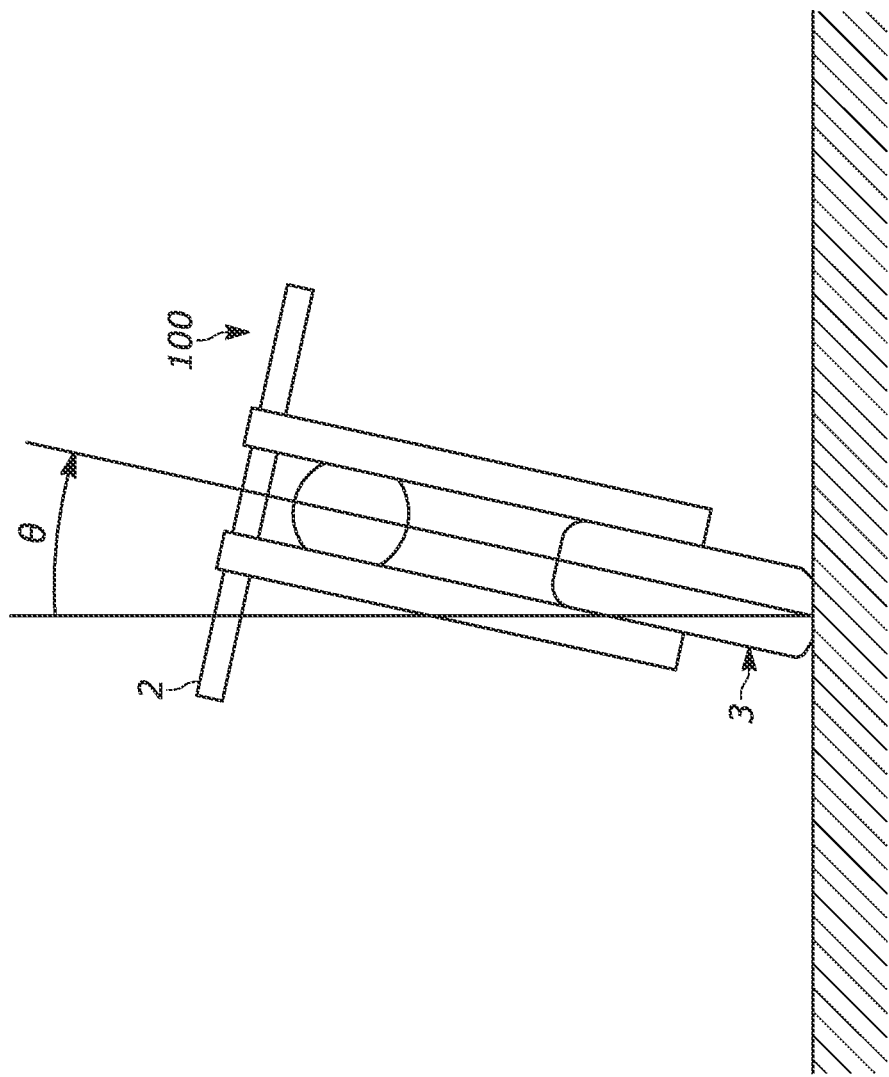
FIG. 5 is a view illustrating a lean angle.

A description will be made on a configuration of a brake system 10 according to an embodiment of the invention. FIG. 1 is a schematic view of an exemplary configuration of a motorcycle 100 on which the brake system 10 according to the embodiment of the invention is mounted. FIG. 2 is a schematic view of an exemplary configuration of the brake system 10 according to the embodiment of the invention. FIG. 3 is a schematic view of an exemplary configuration of a damping device 80 according to the embodiment of the invention. In FIG. 3, components of the motorcycle 100 including the damping device 80 are depicted as seen from above. FIG. 4 is a block diagram of an exemplary functional configuration of a controller 60 according to the embodiment of the invention. FIG. 5 is a view illustrating a lean angle.

As depicted in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner. The handlebar 2 corresponds to a steering according to the invention.

For example, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13.

The first brake operation section 11 is provided on the handlebar 2 and is operated by a driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not depicted) is installed; a reservoir 22 that is attached to the master cylinder 21; a brake caliper 23 that is held by the trunk 1 and has a brake pad (not depicted); a wheel cylinder 24 that is provided in the brake caliper 23; a primary channel 25 through which brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. A first valve (USV) 35 is provided in a portion of the primary channel 25 that is between an end of the primary channel 25 on the master cylinder 21 side and a portion of the primary channel 25 to which a downstream end of the secondary channel 26 is connected. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in the unenergized state and opened in the energized state, for example. The first valve 35 is an electromagnetic valve that is opened in the unenergized state and is closed in the energized state, for example. The second valve 36 is an electromagnetic valve that is closed in the unenergized state and is opened in the energized state, for example.

A hydraulic pressure control unit 50 is configured by including: members such as the inlet valves 31, the outlet valves 32, the accumulators 33, the pumps 34, the first valves 35, and the second valves 36; a base body 51 that is provided with those members and is formed with channels constituting the primary channels 25, the secondary channels 26, and the supply channels 27 therein; and the controller (ECU) 60. In the brake system 10, the hydraulic pressure control unit 50 is a unit that has a function of controlling a hydraulic pressure of the brake fluid in each of the wheel cylinders 24, that is, a braking force to be applied to the front wheel 3 by the front-wheel brake mechanism 12 and a braking force to be applied to the rear wheel 4 by the rear-wheel brake mechanism 14.

The members may collectively be provided in the single base body 51 or may separately be provided in the multiple base bodies 51. In addition, the controller 60 may be provided as one unit or may be divided into multiple units. Furthermore, the controller 60 may be attached to the base body 51 or may be attached to a member other than the base body 51. Moreover, the controller 60 may partially or entirely be constructed of a microcomputer, a microprocessor unit, or the like, may be constructed of a member in which firmware and the like can be updated, or may be a program module or the like that is executed by a command from a CPU or the like, for example.

In a normal state, that is, in a state where an automatic deceleration operation, which will be described below, is not executed, the controller 60 opens the inlet valves 31, closes the outlet valves 32, opens the first valves 35, and closes the second valves 36. When the first brake operation section 11 is operated in such a state, in the front-wheel brake mechanism 12, the piston (not depicted) in the master cylinder 21 is pressed to increase the hydraulic pressure of the brake fluid in the wheel cylinder 24, the brake pad (not depicted) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not depicted) in the master cylinder 21 is pressed to increase the hydraulic pressure of the brake fluid in the wheel cylinder 24, the brake pad (not depicted) of the brake caliper 23 is then pressed against a rotor 4a of the rear wheel 4, and the braking force is thereby applied to the rear wheel 4.

As depicted in FIG. 1 and FIG. 3, the motorcycle 100 includes the damping device 80 that damps rotary movement of the handlebar 2 as the steering.

The handlebar 2 includes a right and left pair of front forks 71 and a bridge 73, for example. The bridge 73 is freely rotatably about a steering stem 5 as a rotation axis and is fixed to the right and left pair of the front forks 71. The steering stem 5 is fixed to the trunk 1. The front wheel 3 is held by lower portions of the right and left pair of the front forks 71 in a freely rotatable manner. For example, a connection member 6 is fixed to one end side (for example, a right end side) of the bridge 73, and the connection member 6 is connected to one end of a shaft section 86, which will be described below, in the damping device 80.

The damping device 80 includes: a body section 81 that is filled with oil; and the shaft section 86 that is inserted through the body section 81 and slides with respect to the body section 81. The body section 81 is connected to the trunk 1 in a freely rotatable manner in a rotational direction of the handlebar 2. For example, the shaft section 86 is provided to penetrate the body section 81 from one end side to the other end side along an extending direction of the body section 81. In addition, the one end of the shaft section 86 is connected to the connection member 6 in the freely rotatable manner in the rotational direction of the handlebar 2.

The body section 81 is provided therein with: a cylinder section 82 in which a piston 87 provided on the shaft section 86 slides; a bypass channel 83 that communicates between one end side and the other end side of the cylinder section 82; and a flow rate regulating valve 84 that regulates a flow rate of the oil in the bypass channel 83. For example, the cylinder section 82 extends from the one end side to the other end side in the body section 81 and has a cross-sectional shape that corresponds to a cross-sectional shape of the piston 87. For example, the bypass channel 83 is connected to the one end and the other end of the cylinder section 82 and communicates between a portion on the one end side and a portion on the other end side of the cylinder section 82 that are partitioned by the piston 87. For example, the flow rate regulating valve 84 is provided in the bypass channel 83 and regulates a channel area of the bypass channel 83, so as to regulate the flow rate of the oil in the bypass channel 83.

In the damping device 80, the shaft section 86 moves relative to the body section 81 when the bridge 73 rotates about the steering stem 5 as the rotation axis. In this way, the piston 87 slides in the cylinder section 82, and a damping force as a resistive force against the rotary movement of the handlebar 2 is thereby generated. Consequently, the rotary movement of the handlebar 2 is damped by the damping device 80.

In the damping device 80, in the case where a rotational frequency of the handlebar 2 (in other words, a change rate of a steering angle) is the same, a larger amount of the damping force is generated (that is, a damping rate of the damping device 80 is increased) as the channel area of the bypass channel 83, which is regulated by the flow rate regulating valve 84, is reduced. Accordingly, the damping rate of the damping device 80 can be controlled by controlling an operation of the flow rate regulating valve 84.

As depicted in FIG. 2 and FIG. 4, the brake system 10 includes master-cylinder pressure sensors 41, wheel-cylinder pressure sensors 42, a front-wheel rotational frequency sensor 43, a rear-wheel rotational frequency sensor 44, a lean angle sensor 45, a peripheral environment sensor 46, a steering angle sensor 47, and an input device 48, for example. Each of the sensors and the input device 48 is communicable with the controller 60. The peripheral environment sensor 46 is communicable with the input device 48.

Each of the master-cylinder pressure sensors 41 detects a hydraulic pressure of the brake fluid in the master cylinder 21 and outputs a detection result. Each of the master-cylinder pressure sensors 41 may detect another physical quantity that can substantially be converted to the hydraulic pressure of the brake fluid in the master cylinder 21. The master-cylinder pressure sensor 41 is provided in each of the front-wheel brake mechanism 12 and the rear-wheel brake mechanism 14.

Each of the wheel-cylinder pressure sensors 42 detects the hydraulic pressure of the brake fluid in the wheel cylinder 24 and outputs a detection result. Each of the wheel-cylinder pressure sensors 42 may detect another physical quantity that can substantially be converted to the hydraulic pressure of the brake fluid in the wheel cylinder 24. The wheel-cylinder pressure sensor 42 is provided in each of the front-wheel brake mechanism 12 and the rear-wheel brake mechanism 14.

The front-wheel rotational frequency sensor 43 detects a rotational frequency of the front wheel 3 and outputs a detection result. The front-wheel rotational frequency sensor 43 may detect another physical quantity that can substantially be converted to the rotational frequency of the front wheel 3. The rear-wheel rotational frequency sensor 44 detects a rotational frequency of the rear wheel 4 and outputs a detection result. The rear-wheel rotational frequency sensor 44 may detect another physical quantity that can substantially be converted to the rotational frequency of the rear wheel 4. The front-wheel rotational frequency sensor 43 and the rear-wheel rotational frequency sensor 44 are respectively provided on the front wheel 3 and the rear wheel 4.

The lean angle sensor 45 detects a lean angle of the motorcycle 100 and an angular velocity of the lean angle thereof, and outputs a detection result. For example, the lean angle corresponds to a tilt angle θ of the motorcycle 100 in a rolling direction with respect to an upper vertical direction depicted in FIG. 4. Note that the motorcycle 100 is tilted in the rolling direction with respect to the upper vertical direction during turning travel. More specifically, an inertial measurement unit (IMU) that includes a three-axis gyroscope sensor and a three-directional acceleration sensor is used as the lean angle sensor 45. The lean angle sensor 45 may detect another physical quantity that can substantially be converted to the lean angle of the motorcycle 100 and the angular velocity of the lean angle thereof. The lean angle sensor 45 is provided in the trunk 1.

The peripheral environment sensor 46 detects peripheral environment of the motorcycle 100. For example, as the peripheral environment, the peripheral environment sensor 46 detects a distance from the motorcycle 100 to a forward obstacle (for example, a preceding vehicle). The peripheral environment sensor 46 may detect another physical quantity that can substantially be converted to the distance from the motorcycle 100 to the forward obstacle. More specifically, a camera that captures an image in front of the motorcycle 100 or a distance measurement sensor that can detect the distance from the motorcycle 100 to the forward obstacle is used as the peripheral environment sensor 46. The peripheral environment sensor 46 is provided in a front portion of the trunk 1.

In addition, the peripheral environment sensor 46 generates trigger information in accordance with the peripheral environment and outputs the trigger information. The trigger information is used to determine initiation of a control mode, which will be described below. Furthermore, the peripheral environment sensor 46 computes target deceleration in conjunction with generation of the trigger information and outputs a computation result. The target deceleration is a target value of automatic deceleration that is deceleration of the motorcycle 100 generated by the automatic deceleration operation executed in the control mode.

For example, the peripheral environment sensor 46 computes a body speed of the motorcycle 100 on the basis of the rotational frequencies of the front wheel 3 and the rear wheel 4, and estimates duration before arrival on the basis of the distance from the motorcycle 100 to the forward obstacle and the body speed. The duration before arrival is duration before the motorcycle 100 arrives at the forward obstacle. In the case where the duration before arrival is shorter than reference duration, the peripheral environment sensor 46 generates the trigger information that is used to determine the initiation of the control mode in which an automatic emergency deceleration operation is executed as the automatic deceleration operation. The automatic emergency deceleration operation is the automatic deceleration operation that is executed to make the motorcycle 100 stop behind the forward obstacle. The reference duration is set in accordance with estimated duration before the motorcycle 100 stops in the case where the motorcycle 100 executes the automatic emergency deceleration operation.

In this case, more specifically, the peripheral environment sensor 46 computes the deceleration with which the motorcycle 100 can stop behind the forward obstacle by the automatic emergency deceleration operation as the target deceleration. Such target deceleration is computed on the basis of the distance from the motorcycle 100 to the forward obstacle and the body speed, for example.

In addition, for example, in the case where the distance from the motorcycle 100 to the preceding vehicle falls below a distance reference value when the driver selects an automatic cruise travel mode, which will be described below, the peripheral environment sensor 46 generates the trigger information that is used to determine the initiation of the control mode in which an automatic cruise deceleration operation is executed as the automatic deceleration operation. The automatic cruise deceleration operation is the automatic deceleration operation that is executed to make the distance from the motorcycle 100 to the preceding vehicle approximate the distance reference value. As the distance from the motorcycle 100 to the preceding vehicle, the distance reference value is set to such a value that the driver safety can be secured.

In this case, more specifically, the peripheral environment sensor 46 computes the deceleration with which the distance from the motorcycle 100 to the preceding vehicle can promptly approximate the distance reference value while a collision with the preceding vehicle is avoided by the automatic cruise deceleration operation, and sets such deceleration as the target deceleration. Such target deceleration is computed on the basis of the body speed and a difference between the distance from the motorcycle 100 to the preceding vehicle and the distance reference value, for example.

The steering angle sensor 47 detects the steering angle of the motorcycle 100 and an angular velocity of the steering angle thereof, and outputs a detection result. The steering angle sensor 47 may detect another physical quantity that can substantially be converted to the steering angle of the motorcycle 100 and the angular velocity of the steering angle thereof. The steering angle sensor 47 is provided on the handlebar 2.

The input device 48 receives a travel mode selection operation by the driver and outputs information indicative of the received operation. As the travel mode, the input device 48 at least receives the selection operation to select the automatic cruise travel mode. The automatic cruise travel mode is a travel mode in which the motorcycle 100 continues traveling with behavior thereof being at least partially controlled automatically. In the automatic cruise travel mode, the motorcycle 100 is controlled such that the distance therefrom to the preceding vehicle approximates the distance reference value. For example, a lever, a button, or a touch panel may be used as the input device 48. The input device 48 is provided on the handlebar 2, for example.

The controller 60 controls the behavior of the motorcycle 100. The controller 60 includes an acquisition section 61 and an execution section 62, for example. The acquisition section 61 acquires the information that is output from each of the sensors and the input device 48, and outputs the acquired information to the execution section 62. The execution section 62 includes a deceleration control section 63, a damping rate control section 64, a trigger determination section 65, and an avoidance intention determination section 66, for example. Each of the determination sections executes determination processing by using the information that is output from each of the sensors. In accordance with a determination result by the trigger determination section 65, the execution section 62 initiates the control mode that makes the motorcycle 100 execute the automatic deceleration operation. In the control mode, the deceleration control section 63 outputs a command that governs the operations of the inlet valves 31, the outlet valves 32, the pumps 34, the first valves 35, the second valves 36, and the like, so as to control the automatic deceleration that is the deceleration of the motorcycle 100 generated by the automatic deceleration operation. In addition, in the control mode, the damping rate control section 64 outputs a command that governs the operations of the flow rate regulating valve 84 and the like, so as to control the damping rate of the damping device 80.

The controller 60 includes a storage element, and the information such as the reference values used in the processing executed by the controller 60 may be stored in the storage element in advance.

In the automatic cruise travel mode, an automatic cruise acceleration operation is controlled by another controller that is a separate component from the controller 60 or is integrated with the controller 60, for example. The automatic cruise acceleration operation is an operation to accelerate the motorcycle 100 without relying on the driver's operation. Automatic acceleration as acceleration of the motorcycle 100 that is generated during the automatic cruise acceleration operation may be controlled when the other controller controls engine output of the motorcycle 100.

<Operation of Brake System>

Figure 6:
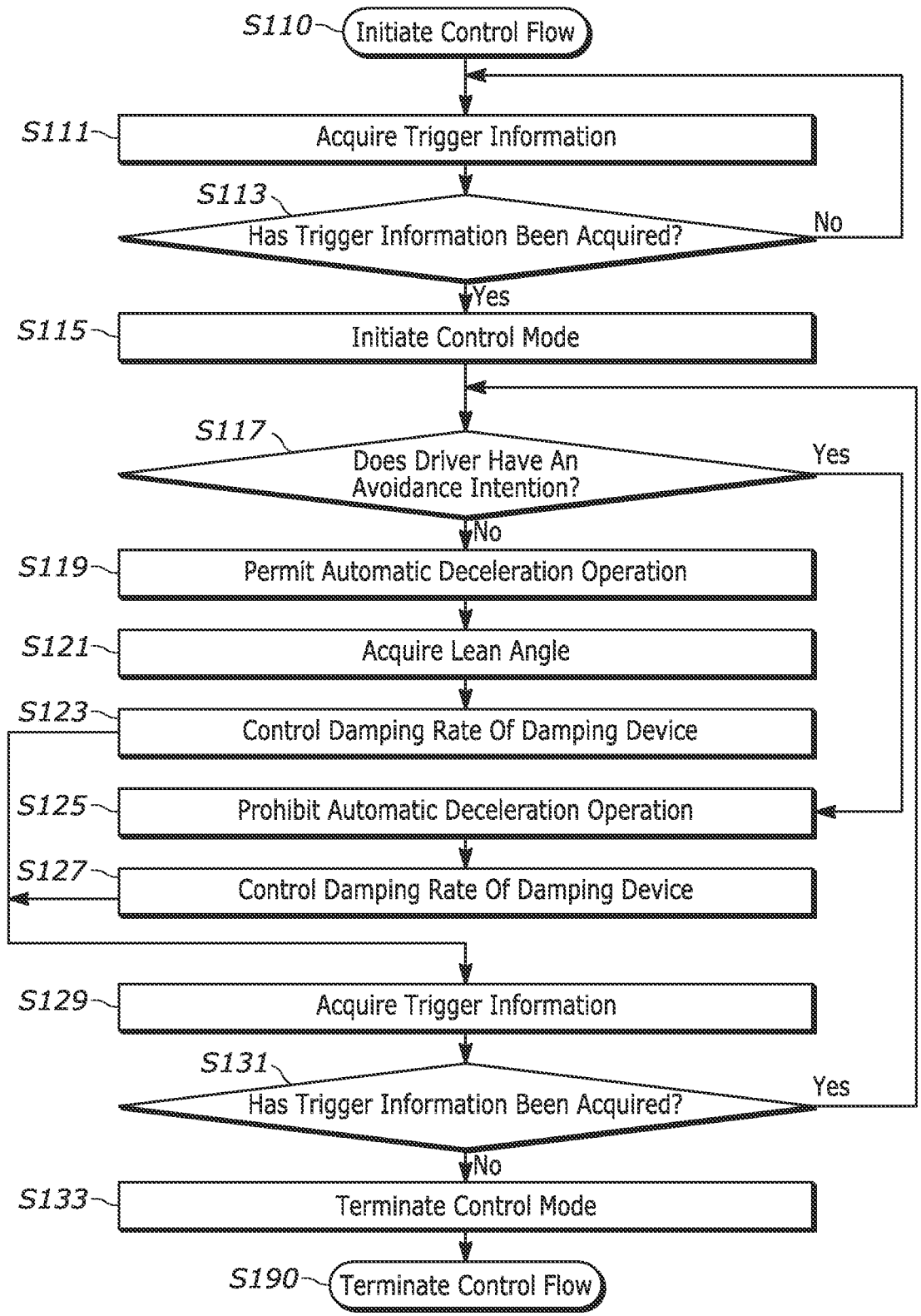
FIG. 6 is a flowchart of an example of a processing procedure that is executed by the controller according to the embodiment of the invention.
Figure 7:
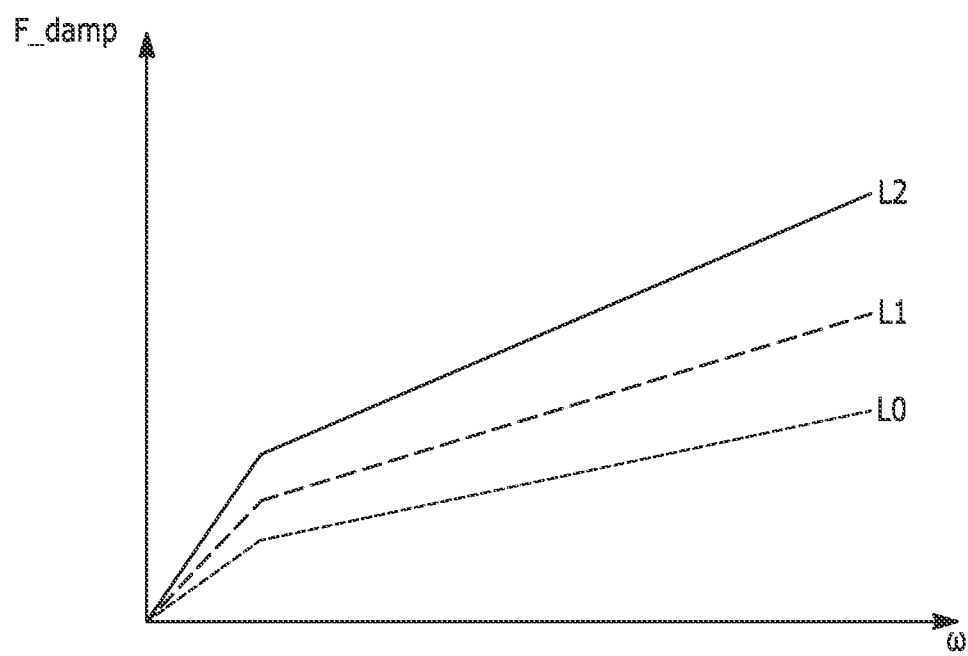
FIG. 7 is a schematic graph of an exemplary characteristic of a damping force with respect to a change rate of a steering angle at each damping rate of the damping device according to the embodiment of the invention.

A description will be made on an operation of the brake system 10 according to the embodiment of the invention. FIG. 6 is a flowchart of an example of a processing procedure that is executed by the controller 60 according to the embodiment of the invention. A control flow depicted in FIG. 6 is repeated during activation of the brake system 10 (in other words, during an operation of the motorcycle 100). Step S110 and step S190 in FIG. 6 respectively correspond to initiation and termination of the control flow. In step S110, the control flow is initiated in a state where the control mode is not initiated. FIG. 7 is a schematic graph of an exemplary characteristic of a damping force F_damp with respect to a steering angular velocity ω that is the change rate of the steering angle at the each damping rate of the damping device 80 according to the embodiment of the invention.

In step S111, the acquisition section 61 acquires the trigger information. Note that the case where the peripheral environment sensor 46 generates the trigger information has been described above; however, the controller 60 may generate the trigger information. For example, the detection result of the distance from the motorcycle 100 to the forward obstacle may be output from the peripheral environment sensor 46 to the controller 60, and the controller 60 may generate the trigger information on the basis of the distance from the motorcycle 100 to the forward obstacle. In this way, the acquisition section 61 can acquire the trigger information.

For example, in the case where the duration before the motorcycle 100 arrives at the forward obstacle, which is estimated on the basis of the distance from the motorcycle 100 to the forward obstacle, is shorter than the reference duration, the controller 60 may generate the trigger information that is used to determine the initiation of the control mode in which the automatic emergency deceleration operation is executed as the automatic deceleration operation. In addition, for example, in the case where the distance from the motorcycle 100 to the preceding vehicle falls below the distance reference value when the driver selects the automatic cruise travel mode, the controller 60 may generate the trigger information that is used to determine the initiation of the control mode in which the automatic cruise deceleration operation is executed as the automatic deceleration operation.

Next, in step S113, the trigger determination section 65 determines whether the trigger information has been acquired. If it is determined that the trigger information has been acquired (step S113/YES), the processing proceeds to step S115. On the other hand, if it is determined that the trigger information has not been acquired (step S113/NO), the processing returns to step S111.

In step S115, the execution section 62 initiates the control mode to make the motorcycle 100 execute the automatic deceleration operation. More specifically, the execution section 62 initiates the control mode that corresponds to the trigger information acquired in step S111.

For example, in the case where the trigger information that is used to determine the initiation of the control mode to make the motorcycle 100 execute the automatic emergency deceleration operation is acquired in step S111, the execution section 62 initiates the control mode to make the motorcycle 100 execute the automatic emergency deceleration operation. Meanwhile, for example, in the case where the trigger information that is used to determine the initiation of the control mode to make the motorcycle 100 execute the automatic cruise deceleration operation is acquired in step S111, the execution section 62 initiates the control mode to make the motorcycle 100 execute the automatic cruise deceleration operation.

Next, in step S117, the avoidance intention determination section 66 determines whether the driver has an avoidance intention that is an intention to avoid the forward obstacle. If it is determined that the driver has the avoidance intention (step S117/YES), the processing proceeds to step S125. On the other hand, if it is determined that the driver does not have the avoidance intention (step S117/NO), the processing proceeds to step S119.

For example, in the case where a change rate of a state amount that is related to the posture of the motorcycle 100 during the turning travel exceeds a change rate reference value, the avoidance intention determination section 66 determines that the driver has the avoidance intention. The state amount that is related to the posture of the motorcycle 100 during the turning travel includes the lean angle, the angular velocity of the lean angle, the steering angle, or the angular velocity of the steering angle, for example. The change rate reference value is set to such a value that a determination on whether a possibility of the driver having the avoidance intention is high can be made.

Alternatively, for example, in the case where an operation amount that is related to the operation of the motorcycle 100 by the driver exceeds an operation amount reference value, the avoidance intention determination section 66 determines that the driver has the avoidance intention. The operation of the motorcycle 100 by the driver includes an accelerator pedal operation, a brake operation, and a clutch operation, for example. The operation amount reference value is set to such a value that a determination on whether the driver has operated the motorcycle 100 can be made.

In step S119, the deceleration control section 63 permits the automatic deceleration operation. Once permitting the automatic deceleration operation, the deceleration control section 63 causes the generation of the automatic deceleration that is the deceleration independent of the driver's operation, and makes the motorcycle 100 execute the automatic deceleration operation. For example, the deceleration control section 63 causes the generation of the automatic deceleration through generation of the braking force that is applied to the wheel by at least one of the front-wheel brake mechanism 12 and the rear-wheel brake mechanism 14. More specifically, the deceleration control section 63 drives the pump 34 in a state where the inlet valve 31 is opened, the outlet valve 32 is closed, the first valve 35 is closed, and the second valve 36 is opened, so as to cause the generation of the braking force that is applied to the wheel.

The deceleration control section 63 controls a rotational frequency of the pump 34 and thereby controls the braking force that is applied to the wheel. More specifically, based on the target deceleration that is output from the peripheral environment sensor 46, the deceleration control section 63 decides a target hydraulic pressure that is a target value of the hydraulic pressure of the brake fluid in the wheel cylinder 24. Then, the deceleration control section 63 controls the rotational frequency of the pump 34 such that the hydraulic pressure of the brake fluid in the wheel cylinder 24 matches the target hydraulic pressure. In this way, the automatic deceleration is controlled to match the target deceleration.

Note that the case where the deceleration control section 63 controls the automatic deceleration by controlling the braking force that is applied to the wheel has been described above; however, the deceleration control section 63 may control the automatic deceleration by controlling the engine output of the motorcycle 100. More specifically, the deceleration control section 63 may control the automatic deceleration by using an operational effect of engine brake that is exerted when the engine output is lowered. Alternatively, the deceleration control section 63 may control the automatic deceleration by controlling both of the braking force that is applied to the wheel and the engine output.

Note that the case where the peripheral environment sensor 46 computes the target deceleration has been described above; however, the controller 60 may compute the target deceleration. For example, the detection result of the distance from the motorcycle 100 to the forward obstacle may be output from the peripheral environment sensor 46 to the controller 60, and the controller 60 may compute the target deceleration on the basis of the distance from the motorcycle 100 to the forward obstacle and the body speed.

Next, in step S121, the acquisition section 61 acquires the lean angle of the motorcycle 100.

Next, in step S123, the damping rate control section 64 controls the damping rate of the damping device 80 to be the higher damping rate than the damping rate immediately before the initiation of the control mode. For example, upon initiation of the automatic deceleration operation, the damping rate control section 64 increases the damping rate of the damping device 80 to be higher than that immediately before the initiation of the control mode. Just as described, in the control mode, the automatic deceleration operation is executed in a state where the damping rate of the damping device 80 is increased to be higher than that immediately before the initiation of the control mode.

For example, before the initiation of the control mode, the damping rate control section 64 controls the damping rate of the damping device 80 to be a set damping rate that is set in advance. Note that, before the initiation of the control mode, the damping rate control section 64 may regulate the damping rate of the damping device 80 in accordance with the body speed. For example, before the initiation of the control mode, the damping rate control section 64 may increase the damping rate of the damping device 80 along with an increase in the body speed. Accordingly, immediately before the initiation of the control mode, there is a case where the damping rate of the damping device 80 is maintained, and there is also a case where the damping rate of the damping device 80 is changed. In either one of such cases, in step S123, the damping rate of the damping device 80 is controlled to be the higher damping rate than the damping rate immediately before the initiation of the control mode.

The damping rate control section 64 controls the damping rate of the damping device 80 in accordance with the lean angle of the motorcycle 100, for example. More specifically, in the case where the lean angle is large, the damping rate control section 64 controls the damping rate of the damping device 80 to be the higher damping rate than that when the lean angle is small.

A characteristic line that represents the characteristic of the damping force F_damp with respect to the steering angular velocity co immediately before the initiation of the control mode is a characteristic line L0 depicted in FIG. 7, for example. Meanwhile, characteristic lines that represent the characteristic of the damping force F_damp with respect to the steering angular velocity co in the automatic deceleration operation are a characteristic line L1 depicted in FIG. 7 of the case where the lean angle is small, and a characteristic line L2 depicted in FIG. 7 of the case where the lean angle is large, for example. As represented by each of the characteristic lines, the damping force F_damp is increased as the steering angular velocity co is increased. Each of the characteristic line L1 and the characteristic line L2 in the automatic deceleration operation represents such a characteristic that the damping force F_damp has a larger value at the each steering angular velocity co than that in the characteristic line L0 immediately before the initiation of the control mode. Furthermore, compared to the characteristic line L1 of the case where the lean angle is small, the characteristic line L2 of the case where the lean angle is large in the automatic deceleration operation represents such a characteristic that the damping force F_damp has the large value at the each steering angular velocity co.

Note that a shape of each of the characteristic lines depicted in FIG. 7 is merely one example and possibly differs by a structure of the damping device 80, a positional relationship between the damping device 80 and the other members, or the like.

In step S125, the deceleration control section 63 prohibits the automatic deceleration operation. Once prohibiting the automatic deceleration operation, the deceleration control section 63 brings the motorcycle 100 into the normal state where the deceleration is generated in the motorcycle 100 in accordance with the driver's operation. More specifically, the deceleration control section 63 brings the motorcycle 100 into a state where the inlet valves 31 are opened, the outlet valves 32 are closed, the first valves 35 are opened, and the second valves 36 are closed, so as to prohibit driving of the pumps 34.

Next, in step S127, the damping rate control section 64 controls the damping rate of the damping device 80 to be the same as that before the initiation of the control mode. For example, upon termination of the automatic deceleration operation, the damping rate control section 64 lowers the damping rate of the damping device 80 to be lower than that immediately before the termination of the automatic deceleration operation. Just as described, in the control mode, in the case where the automatic deceleration operation is prohibited and thereby terminated, the damping rate of the damping device 80 is controlled to be the same as that before the initiation of the control mode in the state where the damping rate of the damping device 80 is lowered to be lower than that immediately before the termination of the automatic deceleration operation.

For example, upon the termination of the automatic deceleration operation, the damping rate control section 64 lowers the damping rate of the damping device 80 at a lower change rate than a change rate at the time when the damping rate of the damping device 80 is increased to be higher than that immediately before the initiation of the control mode.

Following step S123 or step S127, in step S129, the acquisition section 61 acquires the trigger information.

Next, in step S131, the trigger determination section 65 determines whether the trigger information has been acquired. If it is determined that the trigger information has been acquired (step S131/YES), the processing returns to step S117. On the other hand, if it is determined that the trigger information has not been acquired (step S131/NO), the processing proceeds to step S133.

As described above, if it is determined in step S131 that the trigger information has been acquired (step S131/YES), the control mode continues, and the processing from step S117 to step S129 is repeated.

For example, if the determination result in step S117 is NO in a state where the automatic deceleration operation is permitted, the deceleration control section 63 continues the state where the automatic deceleration operation is permitted. In this case, the damping rate control section 64 controls the damping rate of the damping device 80 during the automatic deceleration operation in accordance with the lean angle acquired during the automatic deceleration operation.

Meanwhile, if the determination result in step S117 is YES in the state where the automatic deceleration operation is permitted, the deceleration control section 63 cancels the state where the automatic emergency deceleration operation is permitted, and prohibits the automatic emergency deceleration operation. As described above, in the case where it is determined that the driver has the avoidance intention during the automatic deceleration operation, the automatic deceleration operation is prohibited and terminated.

In step S133, the execution section 62 terminates the control mode.

Here, a case where the determination result in step S131 is NO in the state where the automatic deceleration operation is permitted corresponds to a case where the automatic deceleration operation is completed. In such a case, in step S133, the automatic deceleration operation is terminated in conjunction with the termination of the control mode. For example, upon such termination of the automatic deceleration operation, as described above, the damping rate control section 64 lowers the damping rate of the damping device 80 at the lower change rate than the change rate at the time when the damping rate of the damping device 80 is increased to be higher than that immediately before the initiation of the control mode.

<Effects of Brake System>

A description will be made on effects of the brake system 10 according to the embodiment of the invention.

In the brake system 10, the control mode is initiated in response to the trigger information that is generated in accordance with the peripheral environment of the motorcycle 100, and the control mode makes the motorcycle 100, which includes the damping device 80 damping the kinetic energy, execute the automatic deceleration operation. In the control mode, the automatic deceleration operation is executed in the state where the damping rate of the damping device 80 is increased to be higher than that immediately before the initiation of the control mode. In this way, it is possible to prevent movement against the driver's intention from being generated to the motorcycle 100 by the automatic deceleration operation. Therefore, safety can be improved by the automatic deceleration operation while falling of the motorcycle 100 is prevented.

Preferably, the damping device 80 is the steering damper that damps the rotary movement of the steering (the handlebar 2) of the motorcycle 100. In such a case, even in the case where the automatic deceleration operation is initiated in a state where the driver does not pay attention to the steering (the handlebar 2), that is, a state where the driver's gripping force to grip the steering (the handlebar 2) is weakened, the safety can be improved by the automatic deceleration operation while falling of the motorcycle 100 is prevented.

Preferably, in the brake system 10, during the automatic deceleration operation in the control mode, in the case where the lean angle of the motorcycle 100 is large, the damping rate of the damping device 80 is controlled to be the higher damping rate than that when the lean angle is small. Here, in the case where the lean angle is large, the posture of the motorcycle 100 during the automatic deceleration operation is more likely to be changed in comparison with the case where the lean angle is small. For example, when the braking force is applied to the wheel during the turning travel, a force in a direction to change tilting of the motorcycle 100 (for example, a direction to raise the motorcycle 100) possibly acts on the motorcycle 100. In the case where the lean angle is large, a large force as such a force more likely to act on the motorcycle 100 in comparison with the case where the lean angle is small. Accordingly, the posture of the motorcycle 100 during the automatic deceleration operation is likely to be changed. Thus, during the automatic deceleration operation in the control mode, when the damping rate of the damping device 80 is controlled in accordance with the lean angle, it is possible to effectively prevent the movement against the driver's intention from being generated to the motorcycle 100 by the automatic deceleration operation. Therefore, falling of the motorcycle 100 can effectively be prevented.

Preferably, in the brake system 10, in the control mode, the damping rate of the damping device 80 during the automatic deceleration operation is controlled in accordance with the lean angle that is acquired during the automatic deceleration operation. In this way, the damping rate of the damping device 80 during the automatic deceleration operation can appropriately be controlled in accordance with a change in the lean angle over time during the automatic deceleration operation. For example, in the case where the lean angle is increased over time during the automatic deceleration operation, the damping rate of the damping device 80 can appropriately be increased. Therefore, falling of the motorcycle 100 can further effectively be prevented.

Preferably, in the brake system 10, upon the termination of the automatic deceleration operation, the damping rate of the damping device 80 is lowered at the lower change rate than the change rate at the time when the damping rate of the damping device 80 is increased to be higher than that immediately before the initiation of the control mode. In this way, upon the termination of the automatic deceleration operation, a steep change in the damping rate of the damping device 80 can be prevented. Therefore, it is possible to prevent the driver from receiving a sense of discomfort in association with the steep change in the damping rate of the damping device 80.

Preferably, in the brake system 10, in the case where it is determined that the driver has the avoidance intention during the automatic deceleration operation, the automatic deceleration operation is prohibited and terminated. In this way, in the case where a possibility of the driver executing an avoidance operation is high, the automatic deceleration operation can be prohibited. The avoidance operation is an operation to avoid the collision with the forward obstacle by the driver's operation. Thus, it is possible to prevent the deceleration operation from being executed against the driver's intention. Therefore, falling of the motorcycle 100 can further effectively be prevented.

Preferably, in the brake system 10, in the control mode, in the case where the change rate of the state amount that is related to the posture of the motorcycle 100 during the turning travel exceeds the change rate reference value, it is determined that the driver has the avoidance intention. In this way, it is possible to appropriately determine presence or absence of the avoidance intention by the driver in accordance with the change rate of the state amount that is related to the posture of the motorcycle 100 during the turning travel.

Preferably, in the brake system 10, in the control mode, in the case where the operation amount that is related to the operation of the motorcycle 100 by the driver exceeds the operation amount reference value, it is determined that the driver has the avoidance intention. In this way, it is possible to appropriately determine the presence or the absence of the avoidance intention by the driver in accordance with the operation amount that is related to the operation of the motorcycle 100 by the driver.

The invention is not limited to each of the embodiments. For example, all or parts of the embodiments may be combined, or only a part of each of the embodiments may be implemented. In addition, an order of the steps may be switched, for example.

REFERENCE SIGNS LIST

1: Trunk
2: Handlebar
3: Front wheel
3a: Rotor
4: Rear wheel

4a: Rotor
5: Steering stem
6: Connection member
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Master-cylinder pressure sensor
42: Wheel-cylinder pressure sensor
43: Front-wheel rotational frequency sensor
44: Rear-wheel rotational frequency sensor
45: Lean angle sensor
46: Peripheral environment sensor
47: Steering angle sensor
48: Input device
50: Hydraulic pressure control unit
51: Base body
60: Controller
61: Acquisition section
62: Execution section
63: Deceleration control section
64: Damping rate control section
65: Trigger determination section
66: Avoidance intention determination section
71: Front fork
73: Bridge
80: Damping device
81: Body section
82: Cylinder section
83: Bypass channel
84: Flow rate regulating valve
86: Shaft section
87: Piston
100: Motorcycle

The invention claimed is:

1. A controller (60) controlling behavior of a motorcycle (100), the motorcycle (100) including a damping device (80) that damps kinetic energy, the controller comprising:
   an acquisition section (61) that acquires trigger information generated in accordance with peripheral environment of the motorcycle (100); and
   an execution section (62) that initiates a control mode in response to the trigger information, the control mode making the motorcycle (100) execute an automatic deceleration operation, wherein
   in the control mode, the automatic deceleration operation is executed in a state where a damping rate of the damping device (80) is increased to be higher than that immediately before initiation of the control mode, and
   upon termination of the automatic deceleration operation, the damping rate of the damping device (80) is lowered at a lower change rate than a change rate at a time when the damping rate of the damping device (80) is increased to be higher than that immediately before the initiation of the control mode, wherein
   in the case where it is determined that a driver has an avoidance intention during the automatic deceleration operation, the automatic deceleration operation is prohibited and terminated.

2. The controller according to claim 1, wherein
   the damping device (80) is a steering damper that damps rotary movement of a steering of the motorcycle (100).

3. The controller according to claim 1, wherein
   in the automatic deceleration operation in the control mode, in the case where a lean angle of the motorcycle (100) is large, the damping rate of the damping device (80) is controlled to be the higher damping rate than that when the lean angle is small.

4. The controller according to claim 3, wherein
   in the control mode, the damping rate of the damping device (80) during execution of the automatic deceleration operation is controlled in accordance with the lean angle acquired during the automatic deceleration operation.

5. The controller according to claim 1, wherein
   in the control mode, in the case where a change rate of a state amount that is related to posture of the motorcycle (100) during turning travel exceeds a change rate reference value, it is determined that the driver has the avoidance intention.

6. The controller according to claim 1, wherein
   in the control mode, in the case where an operation amount that is related to an operation of the motorcycle (100) by the driver exceeds an operation amount reference value, it is determined that the driver has the avoidance intention.

7. A control method of controlling behavior of a motorcycle (100), the motorcycle (100) including a damping device (80) that damps kinetic energy, the control method comprising:
   an acquisition step (S111) of acquiring trigger information that is generated in accordance with peripheral environment of the motorcycle (100); and
   an execution step (S115) of initiating a control mode in response to the trigger information, the control mode making the motorcycle (100) execute an automatic deceleration operation, wherein
   in the control mode, the automatic deceleration operation is executed in a state where a damping rate of the damping device (80) is increased to be higher than that immediately before initiation of the control mode, and
   upon termination of the automatic deceleration operation, the damping rate of the damping device (80) is lowered at a lower change rate than a change rate at a time when the damping rate of the damping device (80) is increased to be higher than that immediately before the initiation of the control mode, wherein
   in the case where it is determined that a driver has an avoidance intention during the automatic deceleration operation, the automatic deceleration operation is prohibited and terminated.

8. The control method according to claim 7, wherein
   the damping device (80) is a steering damper that damps rotary movement of a steering of the motorcycle (100).

9. A brake system (10) comprising:
   a peripheral environment sensor (46) that detects peripheral environment of a motorcycle (100), the motorcycle (100) including a damping device (80) that damps kinetic energy; and a controller (60) that controls behavior of the motorcycle (100) on the basis of the peripheral environment, wherein the controller (60) includes:

an acquisition section (61) that acquires trigger information generated in accordance with the peripheral environment; and an execution section (62) that initiates a control mode in response to the trigger information, the control mode making the motorcycle (100) execute an automatic deceleration operation, and in the control mode, the automatic deceleration operation is executed in a state where a damping rate of the damping device (80) is increased to be higher than that immediately before initiation of the control mode, and upon termination of the automatic deceleration operation, the damping rate of the damping device (80) is lowered at a lower change rate than a change rate at a time when the damping rate of the damping device (80) is increased to be higher than that immediately before the initiation of the control mode, wherein in the case where it is determined that a driver has an avoidance intention during the automatic deceleration operation, the automatic deceleration operation is prohibited and terminated.

10. The brake system according to claim 9, wherein the damping device (80) is a steering damper that damps rotary movement of a steering of the motorcycle (100).

* * * * *